(12) United States Patent
Montville

(10) Patent No.: US 11,953,362 B2
(45) Date of Patent: Apr. 9, 2024

(54) DISPENSING DEVICE

(71) Applicant: Conrad Franklin Montville, Volo, IL (US)

(72) Inventor: Conrad Franklin Montville, Volo, IL (US)

( * ) Notice: Subject to any disclaimer, the term of this patent is extended or adjusted under 35 U.S.C. 154(b) by 387 days.

(21) Appl. No.: 17/302,797

(22) Filed: May 12, 2021

(65) Prior Publication Data
US 2022/0364898 A1    Nov. 17, 2022

(51) Int. Cl.
*G01F 19/00*    (2006.01)

(52) U.S. Cl.
CPC .................................. *G01F 19/00* (2013.01)

(58) Field of Classification Search
CPC ....................................................... G01F 19/00
See application file for complete search history.

(56) References Cited

U.S. PATENT DOCUMENTS

| | | | |
|---|---|---|---|
| 1,129,022 A | 2/1915 | Schwarzbart | |
| 2,306,273 A | 12/1942 | Lowy | |
| 2,748,778 A | 6/1956 | Olson | |
| 2,931,230 A * | 4/1960 | Lowery | G01F 19/00 215/230 |
| 2,963,027 A | 12/1960 | Hercules | |
| 3,586,008 A | 6/1971 | Fredette | |
| 4,201,233 A | 5/1980 | Jean | |
| 4,239,049 A | 12/1980 | Perry | |
| 5,007,743 A * | 4/1991 | Brennan | A47G 19/027 73/426 |
| 5,752,599 A | 5/1998 | Veltman | |
| 6,273,094 B1 | 8/2001 | Potter | |
| 10,617,145 B2 | 4/2020 | Besso et al. | |
| 10,869,509 B2 | 12/2020 | Akiyama et al. | |
| 2002/0175195 A1 | 11/2002 | Cole | |
| 2006/0029695 A1 * | 2/2006 | Kaczor | G01F 19/00 426/87 |
| 2008/0230546 A1 * | 9/2008 | Cocchiarella | A47G 19/02 220/574 |
| 2017/0055578 A1 | 3/2017 | Oda et al. | |
| 2019/0133176 A1 | 5/2019 | Nakano et al. | |
| 2021/0052000 A1 | 2/2021 | Avedissian | |

* cited by examiner

*Primary Examiner* — Jamel E Williams
(74) *Attorney, Agent, or Firm* — Dunlap Bennett & Ludwig, PLLC

(57) ABSTRACT

A dispensing device for forming equally proportioned quantities of powder. The dispensing device has a body with an upper surface having one or more concave grooves formed therein. One or more flat staging areas may be disposed between the one or more grooves and a perimetrical edge of the upper surface for forming piles of powder that can be urged across the one or more grooves, whereby the powder fills each groove with a generally identical quantities of the powder.

8 Claims, 4 Drawing Sheets

DISPENSING DEVICE

BACKGROUND OF THE INVENTION

The present invention relates to dispensing devices and, more particularly, a dispensing device for dispensing individual or multiple, equally proportioned servings or quantities of powder from respective grooves formed in a staging surface/area of the dispensing device.

It is time consuming to create multiple, evenly distributed proportions of any powder, including but not limited to snuff tobacco. Current solutions for providing equally proportioned quantities of powder involve or incorporate complicated multiple-part mechanisms with moving parts. These solutions also tend to be bulky and do not allow the user to determine their own desired proportion of snuff tobacco to consume.

As can be seen, there is a need for a dispensing device for dispensing multiple portions of equally proportioned doses or quantities of powder from respective grooves of a staging surface. In certain embodiments, the body of the dispensing device that provides the staging surface may be made of glass having one or more grooves adapted for sniffing the powder from the respective grooves.

The present invention limits the amount of effort required and lowers the amount of time needed. The grooves may be sub-level or notches formed in an otherwise flat surface. As the powder is urged across the flat surface, the powder falls into the grooves creating multiple and even proportions almost with ease. The present invention has no moving parts that can wear out and is a unitary construction that provides advantages in the manufacturer and maintenance of the dispensing device.

SUMMARY OF THE INVENTION

In one aspect of the present invention, a dispensing device includes the following: a body with an upper surface having one or more concave grooves formed therein; and one or more staging areas disposed between the one or more concave grooves and a perimetrical edge of the upper surface.

In another aspect of the present invention, the dispensing device includes wherein each concave groove is elongated, wherein each concave groove is elliptical, wherein each concave groove is regressive, wherein each staging area is a function of a total volume defined by the one or more concave grooves, wherein the opening of each groove has a surface area of between 100 millimeters squared (mm$^2$) and 400 mm$^2$, and wherein a linear distance between the perimetrical edge and the one or more concave grooves is between 25 millimeters (mm) and 100 mm, wherein the body is glass.

In yet another aspect of the present invention, a method of forming generally equal quantities of a powder by using the above-mentioned dispensing device includes piling an amount of a powder on one of the one or more staging areas; and urging the powder across the one or more concave grooves.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a dispensing device for forming equally proportioned quantities of powder. The dispensing device has a body with an upper surface having one or more concave grooves formed therein. One or more flat staging areas may be disposed between the one or more grooves and a perimetrical edge of the upper surface for forming piles of powder that can be urged across the one or more grooves, whereby the powder fills each groove with a generally (within zero and two percent) identical amounts of the powder.

It should be understood by those skilled in the art that the use of directional terms such as upper, upward (top), lower, downward (bottom), and the like are used in relation to the illustrative embodiments as they are depicted in the figures, the upward direction being toward the top peripheries or margins of the corresponding figures, while the downward direction is toward the bottom peripheries and margins of the same figures.

Figure 1:
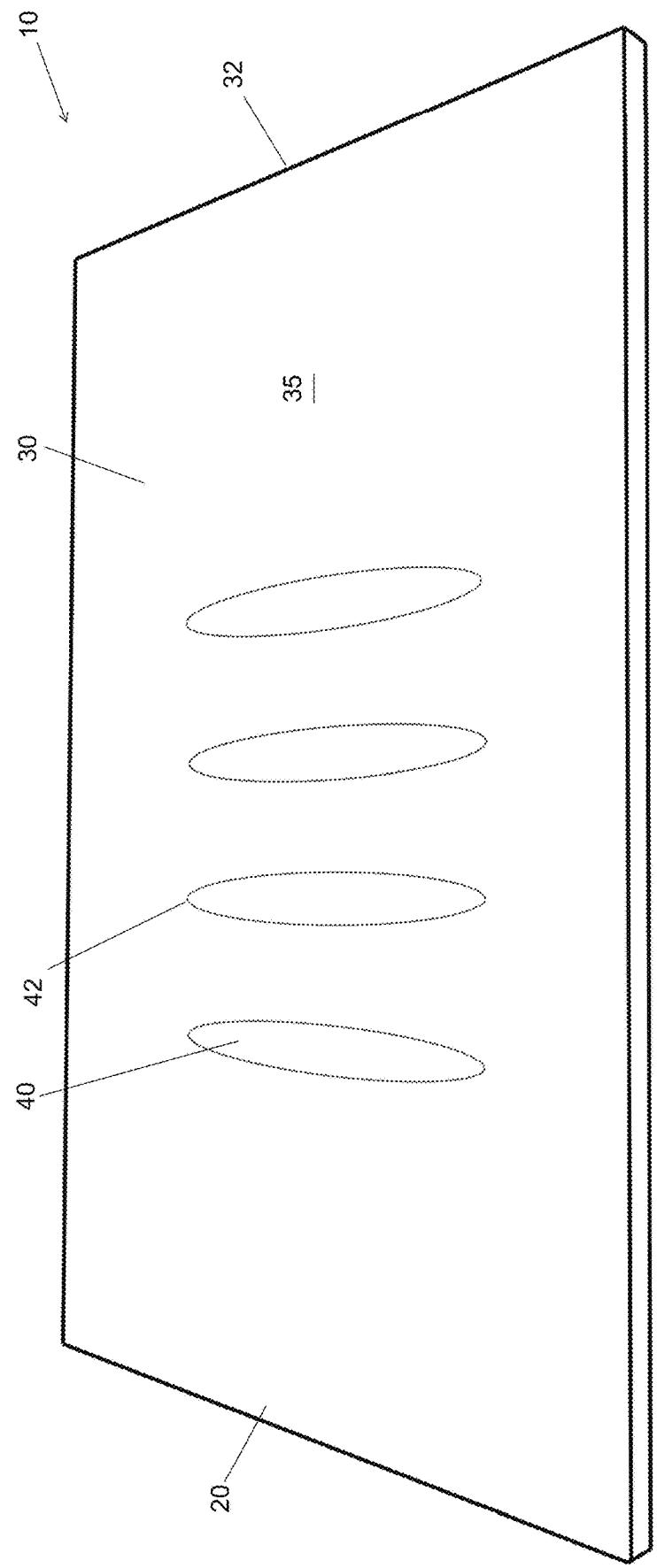
FIG. 1 is a top perspective view of an exemplary embodiment of the present invention.
Figure 2:
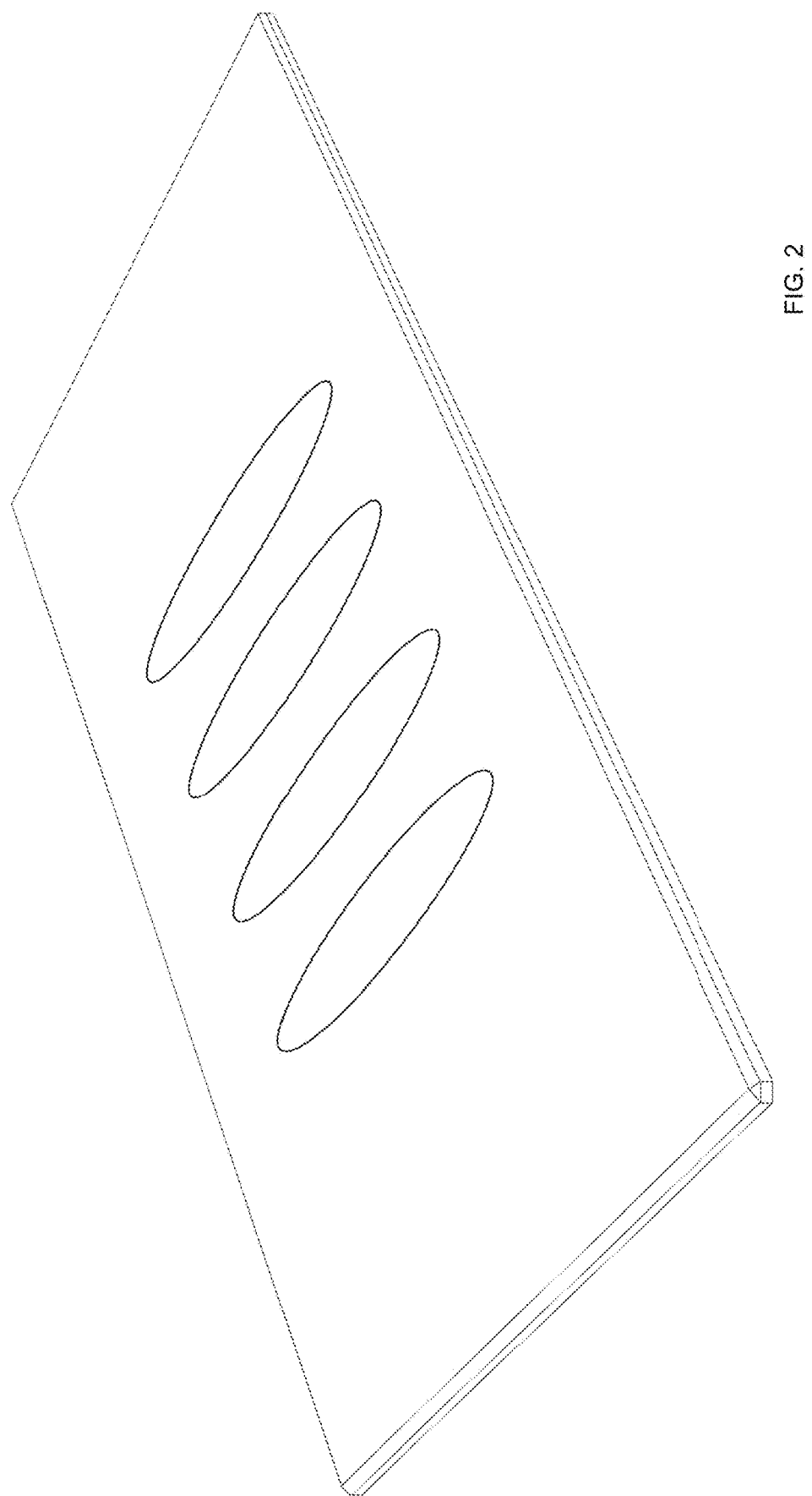
FIG. 2 is a top perspective view of an exemplary embodiment of the present invention.
Figure 3:
FIG. 3 is a section view of an exemplary embodiment of a concave ridge 52 associated with a flat staging area/upper surface of the present invention.
Figure 4:
FIG. 4 is a section view of an exemplary embodiment of a raised ridge 54 associated with a flat staging area/upper surface of the present invention.
Figure 6:
FIG. 6 is a section view of an exemplary embodiment of the present invention, taken along line B-B in FIG. 5, illustrating a groove 40 that is about 2 mm in depth.
Figure 9:
FIG. 9 is a detailed top plan view of an exemplary embodiment of the present invention, illustrating a groove 40 that is approximately 5 mm wide and 51 mm in length. It being understood that the dimensions disclosed in the Brief Description of the Figures can vary as much as over five hundred percent.
Figure 5:
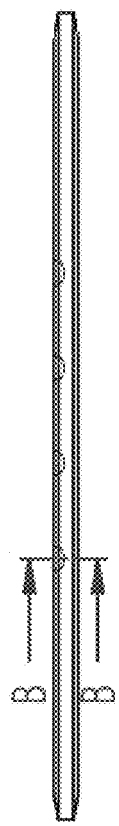
FIG. 5 is a side elevation view of an exemplary embodiment of the present invention, illustrating a beveled edge body 20 having a thickness of about 5 mm.
Figure 7:
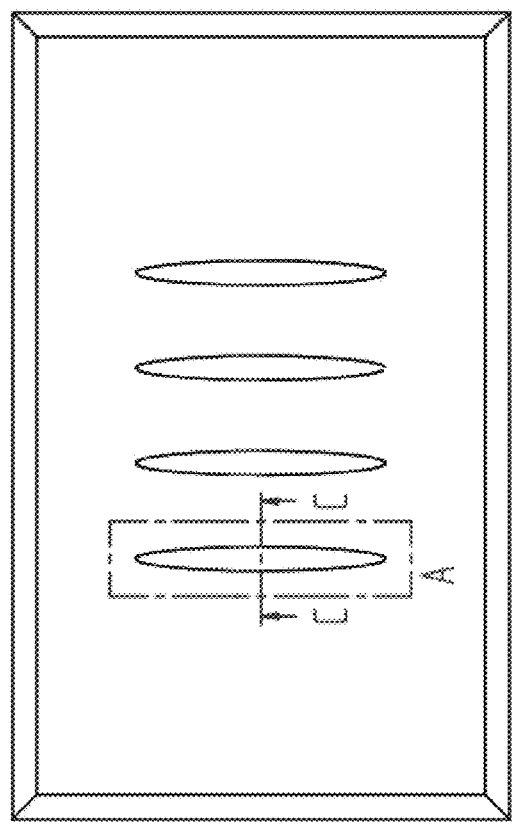
FIG. 7 is a top plan view of an exemplary embodiment of the present invention, illustrating the plurality of grooves 40 being spaced apart about 14.5 mm, wherein the staging area 35 having a distance of 50.8 mm, and wherein the body 20 has a body of about 165 mm in length and 102 mm in width.
Figure 8:
FIG. 8 is a section view of an exemplary embodiment of the present invention, taken along line C-C in FIG. 7.

Referring now to FIGS. 1 through 9, the present invention may include a dispensing device 10 having a body 20 with an upper surface 30 supporting two or more flat staging surfaces 35. The upper surface 12 may provide one or more grooves 40 spaced apart along the upper surface 30. Each groove 40 may have a regressive elliptical cross-section; specifically, the cross-section can be defined as an oval or ellipse having one or two axes of symmetry, wherein the curve defining the ellipse regresses or reduces as the groove 40 extends into the body 20 of the dispensing device 10 away from the upper surface 30. As a result, each groove 40 may be semi-ovoid volumetric shapes. The regressive natures of the grooves 40 facilitate a powder filling in uniformly into the groove 40 as opposed to the powder piling up at a center of the concave groove where along the surfaces of groove 40 the powder would be at a lower elevation than the center.

It should be understood that the grooves 40 need not be elliptical, even though that is what is shown in the Figures. The grooves 40 can be rectangular or any other shape that enables the present invention to function as disclosed herein. The grooves 40 may be elongated, meaning they have a length to width ration greater than one, and that that ratio may range from more than one to less than one hundred or more. In certain embodiments, the grooves 40 may be symmetrical, squares or circles.

The staging area/surface 35 surface area may be a function of the total volume of the grooves 40 so that a sufficient amount of powder may be piled on a portion of the staging area/surface 35, between the grooves 40 and a perimetrical edge 32 of that respective portion of the staging area/surface 35. In certain embodiments, the opening 42 of each groove 40 may have a surface area of between 100 millimeters squared ($mm^2$) and 400 $mm^2$. The staging area/surface 35, the distance between a perimetrical edge 32 and the most adjacent opening 42 of a groove 40 may have such linear distance of between 25 millimeters (mm) and 100 mm.

A manufacturer could use a sturdy and smooth material such as glass, metal, wood, strong fiber, or any such material to construct the dispensing device 10. The manufacture would then use cutting or engraving tools to cut the grooves 20 into the material and form a generally flat upper surface 30 or at least staging areas 35. The dispensing device 10 may provide one or more grooves 40.

Alternative embodiments may include additional elements to facilitate spreading powder across upper surface 30/staging areas 35 and thus into the groove(s) 40. This additional element may include a mechanical device to slide the powder from one side of the upper surface 30 to the other automatically. Adding concave ridge 52 or a raised ridge 54 to each side might add ease of use as described herein.

A method of using the present invention may include the following. The dispensing device 10 disclosed above may be provided. A user may form a pile of powder on the flat staging area/upper surface 30. Typically, but not necessarily, the pile would be disposed adjacent a longitudinal edge of a groove 40. Then using a rigid or semirigid, flat object (not shown), or the user's hand when in a pinch, the user may urge the pile of powder across the grooves 40 until the powder has occupied the one or more grooves 40 or the pile/object has reached the staging area on the other side of the groove(s) 40.

As the powder falls into the grooves 40 the excess powder is urged across the grooves 40, leaving behind a substantially identical amount of powder inside each groove 40, assuming there is sufficient powder to completely fill each groove 40. As one urges the powder across the last groove 40 and to the opposite staging area, the user is ready to repeat the process going the opposite direction to reload the grooves 40 once they have been consumed or to flatten off the top of any powder protruding above the opening of any groove 40.

Accordingly, a person would use the present invention to create portioned sizes of powder in only seconds of time. A person may carry the present invention in a pouch, or store it in their homes, and use it by themselves or with friends.

Any powder can benefit from the present invention, including but not limited to, cooking powders, flours, spices, scientific powders, sniffing tobacco powders, or any powder form.

It should be understood, of course, that the foregoing relates to exemplary embodiments of the invention and that modifications may be made without departing from the spirit and scope of the invention as set forth in the following claims.

What is claimed is:

1. A dispensing device, comprising: a body with an upper surface having one or more concave grooves formed therein; and one or more staging areas disposed between the one or more concave grooves and a perimetrical edge of the upper surface; and a ridge portion extending upward from the perimetrical edge.

2. The dispensing device of claim 1, wherein each concave groove is elongated.

3. The dispensing device of claim 2, wherein each concave groove is elliptical.

4. The dispensing device of claim 2, wherein each concave groove is regressive.

5. The dispensing device of claim 1, wherein each staging area is a function of a total volume defined by the one or more concave grooves.

6. The dispensing device of claim 5, wherein the opening of each groove has a surface area of between 100 millimeters squared ($mm^2$) and 400 $mm^2$, and wherein a linear distance between the perimetrical edge and the one or more concave grooves is between 25 millimeters (mm) and 100 mm.

7. The dispensing device of claim 1, wherein the body is glass.

8. A method of forming generally equal quantities of powdery, the method comprising:
using a dispensing device comprising:
a body with an upper surface having one or more concave grooves formed therein; and
one or more staging areas disposed between the one or more concave grooves and a perimetrical edge of the upper surface;
piling an amount of a powder on one of the one or more staging areas; and
urging the powder across the one or more concave grooves.

* * * * *